United States Patent
Bliss et al.

(10) Patent No.: US 8,024,640 B2
(45) Date of Patent: Sep. 20, 2011

(54) READ/WRITE CHANNEL CODING AND METHODS FOR USE THEREWITH

(75) Inventors: William Gene Bliss, Thornton, CO (US); Bahjat Zafer, Cupertino, CA (US); John P. Mead, Longmont, CO (US)

(73) Assignee: Broadcom Corporation, Irvine, CA (US)

( * ) Notice: Subject to any disclaimer, the term of this patent is extended or adjusted under 35 U.S.C. 154(b) by 1000 days.

(21) Appl. No.: 11/923,472

(22) Filed: Oct. 24, 2007

(65) Prior Publication Data

US 2008/0294840 A1    Nov. 27, 2008

Related U.S. Application Data

(60) Provisional application No. 60/931,816, filed on May 25, 2007.

(51) Int. Cl.
*H03M 13/00* (2006.01)
(52) U.S. Cl. ......... 714/758; 714/752; 714/755; 714/800
(58) Field of Classification Search .................. 714/752, 714/755, 758, 800–804
See application file for complete search history.

(56) References Cited

U.S. PATENT DOCUMENTS

| | | | | |
|---|---|---|---|---|
| 5,619,539 | A | * | 4/1997 | Coker et al. ............... 375/341 |
| 6,366,418 | B1 | * | 4/2002 | McEwen et al. ............ 360/48 |
| 7,388,938 | B2 | * | 6/2008 | Blaum et al. .............. 375/354 |
| 2002/0047788 | A1 | * | 4/2002 | McEwen et al. ............ 341/58 |
| 2003/0066020 | A1 | * | 4/2003 | Morita et al. .............. 714/794 |

OTHER PUBLICATIONS

Wang Yong Hong Wilson, et al; "Guided Scrambling: A New Coding Technique for Holographic Storage"; Data Storage Institute, Singapore; p. 110-112.

* cited by examiner

*Primary Examiner* — Sam Rizk
(74) *Attorney, Agent, or Firm* — Garlick Harrison & Markison; Bruce E. Stuckman

(57) ABSTRACT

A write channel includes a pre-encoding module that encodes write data to produce pre-encoded data. An error correcting code (ECC) module generates ECC data based on the pre-encoded data. A post-encoding module encodes the ECC data to produce post-encoded data. A combining module combines the pre-encoded data and the post-encoded data for writing to the storage medium.

22 Claims, 11 Drawing Sheets

READ/WRITE CHANNEL CODING AND METHODS FOR USE THEREWITH

CROSS REFERENCE TO RELATED PATENTS

This invention is claiming priority under 35 USC §119(e) to a provisionally filed patent application having the same title as the present patent application, a filing date of May 25, 2007, and an application number of 60/931,816.

BACKGROUND OF THE INVENTION

1. Technical Field of the Invention

The present invention relates to disk drives and read and write channel coding.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

A typical magnetic disk drive uses a read/write head that operates via longitudinal magnetic recording. Data to be written on the disk is run-length limited (RLL) coded to limit the number of sequential 0's in the bitstream to attenuate the DC response of the signal that is read back from the disk. The RLL coding allows very high code rates with relatively low complexity. The RLL coded bitstream is coded again with an error correcting code, prior to writing the data, in order to correct errors that can occur in read/write operations.

A sizable market has developed for these devices and the price per unit of storage has steadily dropped. Modern host devices are provided with greater storage capacity at reduced cost, compared with devices that where manufactured a few years earlier. The need exists for efficient disk drives that can store and retrieve data with greater accuracy and at greater density.

SUMMARY OF THE INVENTION

The present invention sets forth a read/write channel and methods for use therewith substantially as shown in and/or described in connection with at least one of the figures, as set forth more completely in the claims that follow.

DETAILED DESCRIPTION OF THE INVENTION INCLUDING THE PRESENTLY PREFERRED EMBODIMENTS

The present invention provides several advantages over the prior art. In an embodiment of the present invention, a coding system for use in a read/write channel in a hard disk drive is presented that can use guided scrambling for running digital sum coding, both before and after error correction coding, particularly when perpendicular magnetic recording is used. The coding system can be programmable for use, for instance, with either longitudinal magnetic recording (LMR) or perpendicular magnetic recording (PMR) heads and different constraints.

Figure 1:
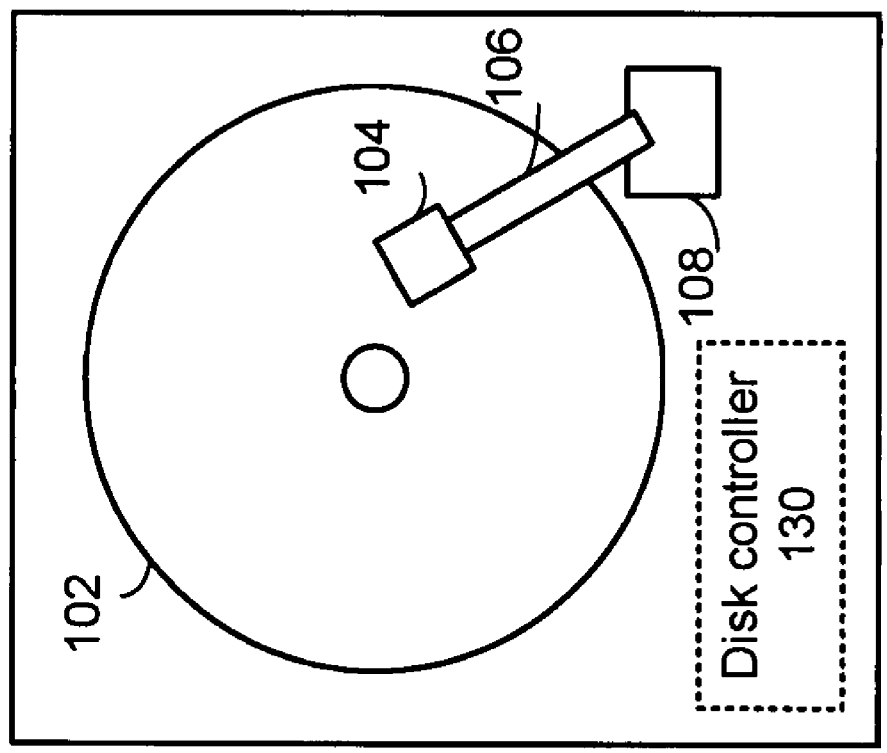
FIG. 1 presents a pictorial representation of a disk drive unit 100 in accordance with an embodiment of the present invention.

FIG. 1 presents a pictorial representation of a disk drive unit 100 in accordance with an embodiment of the present invention. In particular, disk drive unit 100 includes a disk 102 that is rotated by a servo motor (not specifically shown) at a velocity such as 3,600 revolutions per minute (RPM), 4,200 RPM, 4,800 RPM, 5,400 RPM, 7,200 RPM, 10,000 RPM, 15,000 RPM, however, other velocities including greater or lesser velocities may likewise be used, depending on the particular application and implementation in a host device. In an embodiment of the present invention, disk 102 can be a magnetic disk that stores information as magnetic field changes on some type of magnetic medium. The medium can be a rigid or nonrigid, removable or nonremovable, that consists of or is coated with magnetic material.

Disk drive unit 100 further includes one or more read/write heads 104 that read and write data to the disk via longitudinal magnetic recording (LMR), and/or perpendicular magnetic recording (PMR). The read/write heads 104 are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device. Disk controller 130, provides one or more functions or features of the present invention, as described in further detail in conjunction with the figures that follow.

Figure 2:
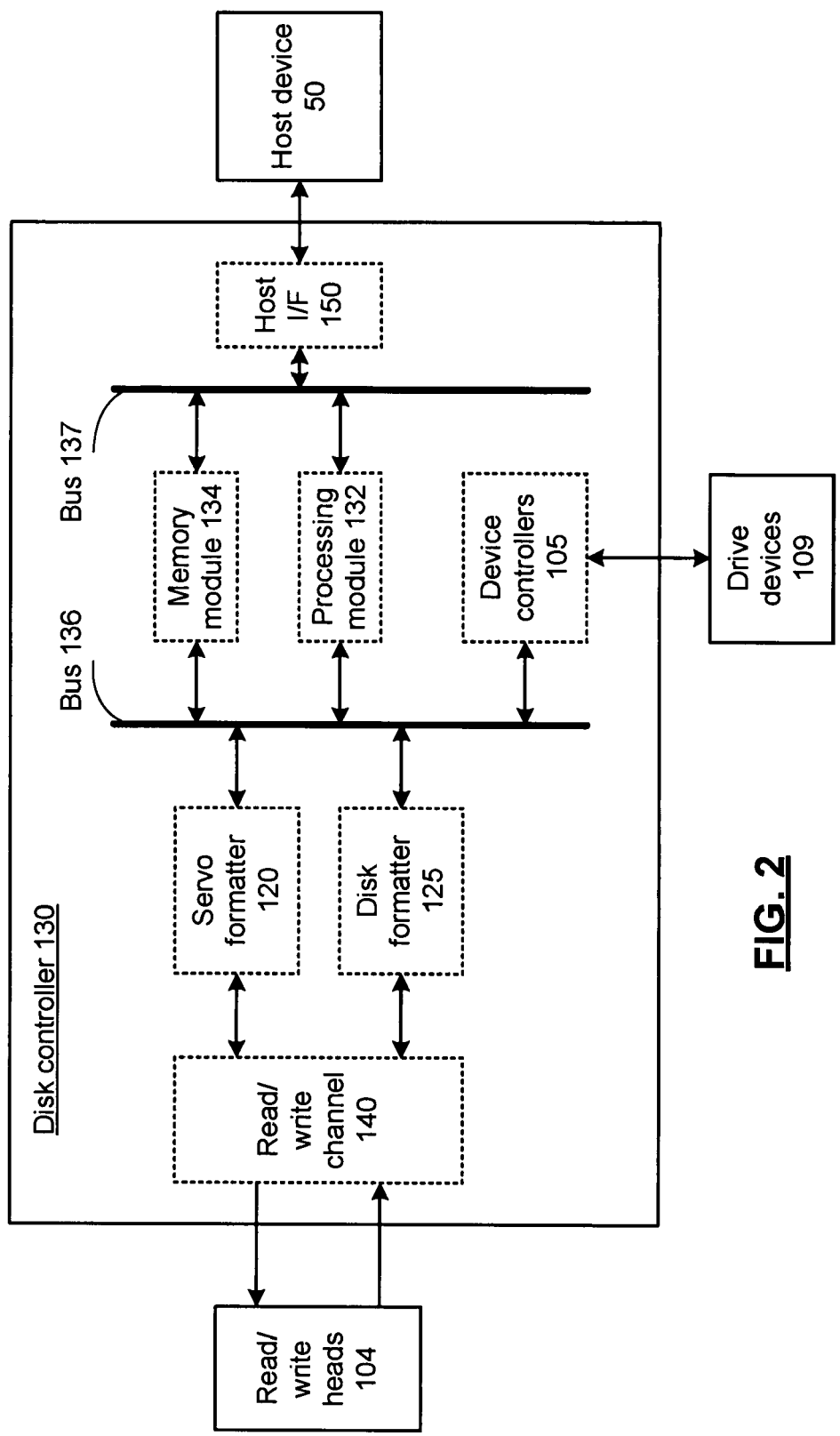
FIG. 2 presents a block diagram representation of a disk controller 130 in accordance with an embodiment of the present invention.

FIG. 2 presents a block diagram representation of a disk controller 130 in accordance with an embodiment of the present invention. In particular, disk controller 130 includes a read/write channel 140 for reading and writing data to and from disk 102 through read/write heads 104. Disk formatter 125 is included for controlling the formatting of data and provides clock signals and other timing signals that control the flow of the data written to, and data read from disk 102 servo formatter 120 provides clock signals and other timing signals based on servo control data read from disk 102, device controllers 105 control the operation of drive devices 109 such as actuator 108 and the servo motor, etc. Host interface 150 receives read and write commands from host device 50 and transmits data read from disk 102 along with other control information in accordance with a host interface protocol. In an embodiment of the present invention the host interface protocol can include, SCSI, SATA, enhanced integrated drive electronics (EIDE), or any number of other host interface protocols, either open or proprietary that can be used for this purpose.

Disk controller 130 further includes a processing module 132 and memory module 134. Processing module 132 can be implemented using a shared processing device or dedicated processing device that includes one or more microprocessors, micro-controllers, digital signal processors, microcomputers, central processing units, field programmable gate arrays, programmable logic devices, state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps of a process, method and/or function illustrated herein.

Disk controller 130 includes a plurality of modules, in particular, device controllers 105, processing module 132, memory module 134, read/write channel 140, disk formatter 125, servo formatter 120 and host interface 150 that are interconnected via buses 136 and 137. Each of these modules can be implemented in hardware, firmware, software or a combination thereof, in accordance with the broad scope of the present invention. While a particular bus architecture is shown in FIG. 2 with buses 136 and 137, alternative bus architectures that include either a single bus configuration or additional data buses, further connectivity, such as direct connectivity between the various modules, are likewise possible to implement the features and functions included in the various embodiments of the present invention.

In an embodiment of the present invention, one or more modules of disk controller 130 are implemented as part of a system on a chip integrated circuit. In an embodiment of the present invention, this system on a chip integrated circuit includes a digital portion that can include additional modules such as protocol converters, linear block code encoding and decoding modules, etc., and an analog portion that includes additional modules, such as a power supply, disk drive motor amplifier, disk speed monitor, read amplifiers, etc. In a further embodiment of the present invention, the various functions and features of disk controller 130 are implemented in a plurality of integrated circuit devices that communicate and combine to perform the functionality of disk controller 130.

Disk controller 130 includes a read/write channel 140 in accordance with the present invention that will be described in greater detail in conjunction with FIGS. 3-9 that follow.

Figures 3, 4:
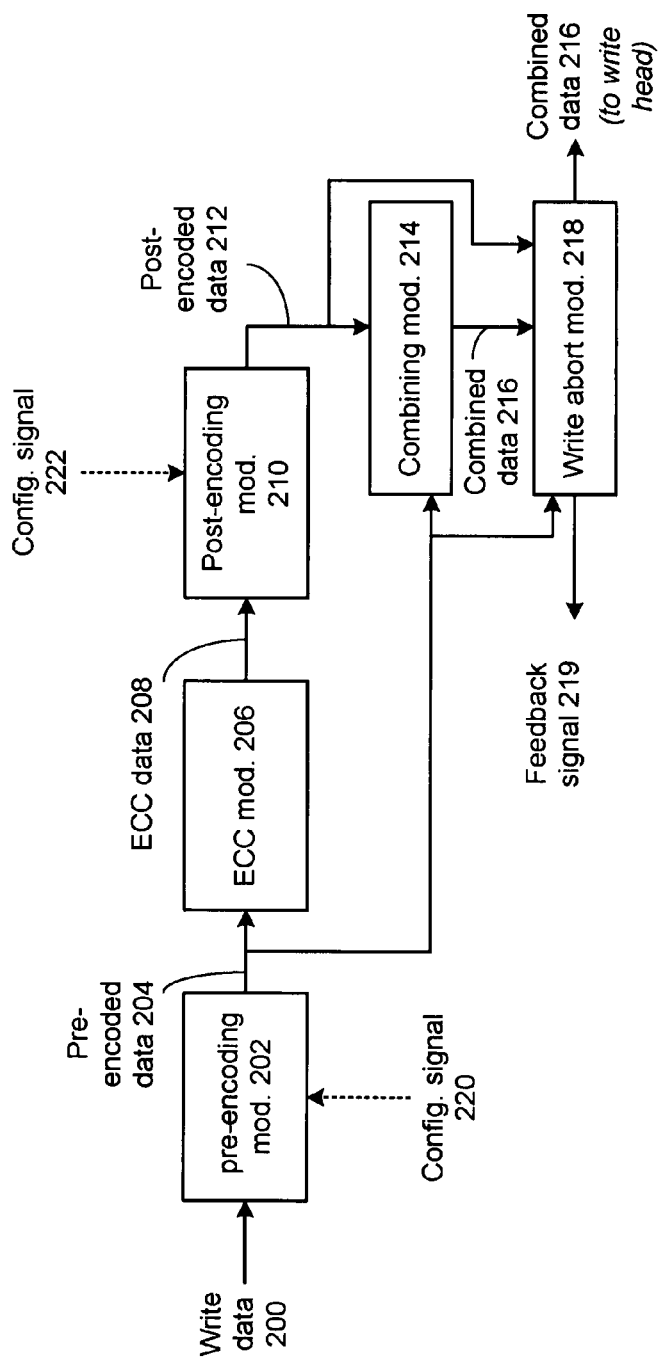
FIG. 3 presents a block diagram representation of components of read/write channel 140 in accordance with an embodiment of the present invention.
FIG. 4 presents a graphical representation of combined data 216 in accordance with an embodiment of the present invention.

FIG. 3 presents a block diagram representation of components of read/write channel 140 in accordance with an embodiment of the present invention. In particular, a pre-encoding module 202 encodes write data 200, that can include user data to be stored, to produce pre-encoded data 204. An error correcting code (ECC) module 206 generates ECC data 208 based on the pre-encoded data 204. A post-encoding module 210 encodes the ECC data 208 to produce post-encoded data 212. A combining module 214 combines the pre-encoded data 204 and the post-encoded data 212 for writing to the storage medium, such as via a write head. While not expressly shown, combined data 216 can be further processed to produce signals of the proper amplitude and format, as required by the write head.

ECC module 206 operates to encode pre-encoded data 204 to produce ECC data 208. ECC module can be implemented in hardware, software or firmware with one or more dedicated or shared processor or dedicated hardware. ECC module 206 can implement a linear block code such as a Reed-Solomon code, BCH code, or a convolution code or other error correcting code to produce encoded ECC data 208 from pre-coded data 204.

In an embodiment of the present invention, the read/write channel 140 could operate in different read/write head environments. For example, in one implementation a LMR read or write head may be used, and in another implementation a PMR read or write head may be used, While RLL codes work well in an LMR environment, greater read/write channel performance can be obtained in a PMR environment by using alternative coding techniques to limit, or significantly attenuate the DC (and very low frequency) content written to the media. This reduces baseline wander error in the read back signal caused by the presence of high-pass filter(s) in the read path (and preamp) which eliminate or reduce the low frequency energy.

One way to mitigate this problem, in addition to the implementation of baseline compensation loop in the read channel, is by encoding the data such that it has no (or lower) DC content. This can be accomplished by a running digital sum (RDS) code that reduces the DC content of the recorded sequence. Unfortunately, the capacities of the RDS codes are less than those of the RLL codes, and are usually harder to implement than the RLL codes. Typical RDS codes usually suffer from lower data rates, large ENDEC tables and potentially higher error propagation, which could negatively affect the ECC power, leading to higher sector failure rate. These issues can be addressed in the present invention by the pre-coding and post-coding performed by pre-coding module 202 and post-coding module 210. Because the read channel operates in a reciprocal fashion, as will be discussed in greater detail in conjunction with FIG. 7, the pre-encoding portion of the RLL/RDS encoding is performed before the ECC encoding, and the reciprocal RLL/RDS decoding is performed after the ECC decoding. The purpose of this arrangement is to eliminate the effect of RLL/RDS decoder error propagation on ECC failure rate. The gain of this approach depends on the error propagation properties of the RLL/RDS code. While this approach uses two-stages of RLL/RDS encoding/decoding with two different RLL/RDS encoders/decoders, the gains achieved by eliminating the error propagation caused mainly by the RDS/RLL decoder can offset the above-mentioned difficulties. Further details regarding this arrangement of the coding process will be described in conjunction with FIG. 4.

In addition, in an embodiment of the present invention, the pre-encoding module 202 can be optionally programmed via configuration signal 220 to different program states to implement one of a plurality of running digital sum (RDS) codes, one of a plurality of RLL codes, and/or bypassed. In a similar fashion, the post-encoding module can be optionally programmed via configuration signal 222 to different program states to implement one of a plurality of RDS codes, one of a plurality of RLL codes, and/or bypassed. Further details regarding pre-encoding module 202, including several optional functions and features are presented in conjunction with FIGS. 4-5. Further details regarding post-encoding module 210, including several optional functions and features are presented in conjunction with FIG. 6.

In an embodiment of the present invention, an optional write abort module 218 is included that is coupled to the pre-encoding module 202 and/or the post encoding module 210. In this embodiment, the write data 200 has been pre-scrambled by a controller or other device of read/write channel 140 using a linear feedback shift register (LFSR) with adjustable initial states or other scrambling technique. The write data 200 in this case includes one or more data bits that either are the initial states of the LFSR, that are mapped to represent the initial states of the LFSR or other scrambling seed that otherwise represents the particular scrambling used. The write abort module 218 evaluates the pre-encoded data 204 and/or the post encoded data 212 based on one or more criteria, such a running digital sum threshold, k criteria, or other criteria. If each of the criteria are satisfied, the combined data 216 is passed to the write head.

If however, one or more of these criteria are violated, write abort module 218 does not pass the combined data 216 to the write head, and instead generates a feedback signal 219 to the controller or other source of the write data 200 requesting that new write data 200 be generated with the same data payload but scrambled with an alternative scrambling seed. New combined data 216 is then generated based on the new write data 200 and the new pre-encoded data 204 and new post-encoded data 212 are again compared to one or more criteria. This process is repeated until, either: (a) each of the criteria are satisfied; (b) all of the possible scramblings of the write data have been exhausted; or (c) a time out occurs, such as reaching a permitted limit for the number of retries. Upon either (a), (b) or (c) the final combined data 216 is passed to the write head to be written on the disk.

The write abort module 218 can be implemented in hardware, software or firmware, based on the particular implementation of read/write channel 140.

FIG. 4 presents a graphical representation of combined data 216 in accordance with an embodiment of the present invention. In this embodiment, combining module 214 operates to form the combined data 216 by concatenating the post-encoded data 212 to the pre-encoded date 204. With this concatenation approach, the ECC data 208, including only the ECC parity, must be RLL/RDS-encoded using a post-encoding module 210 that can be optimized for low error propagation. This could entail an additional overhead penalty, but it can be very small.

In an embodiment of the present invention, the RDS codes used in conjunction with pre-encoding module 202 and post-encoding module 210 are implemented using a guided scrambling technique. For instance, write data of length n is appended with p additional bits at the beginning of the data block to form an input block. Each of the possible $2^p$ combinations of p bits can be used to create $2^p$ input blocks of length n+p bits. Each of these input blocks are scrambled, such as with a linear feedback shift register (LFSR) that implements a binary polynomial (such as a maximal length polynomial for a given order), to form $2^p$ different candidate blocks. Each of these candidate blocks are then evaluated to choose the particular candidate block with the lowest running digital sum. The other candidate blocks can then be discarded. In an embodiment of the present invention these candidate blocks are calculated and evaluated in parallel to reduce the calculation time.

In particular embodiments, pre-encoding module 202, when implementing RDS coding, uses a guided scrambling approach with values such as n=48, 96 or 192 and p=2, 3 or 4 employing binary polynomial division. In one such example, pre-encoding module 202 includes a $7^{th}$ order LFSR that implements the binary polynomial $f(D)=D^7+D^4+1$. Each input block is used as the input to the LFSR with the n+p bit output of the LFSR being the corresponding candidate block. In this example, the initial states of the LFRS are unimportant, as long as the same initial states are used for encoding and decoding. $2^p$ candidate blocks are generated in this fashion (one corresponding to each input block, optionally in parallel using $2^p$ LFSRs) and evaluated to determine the best candidate block that becomes the pre-encoded data 204.

In a further example of guided scrambling that employs a traditional scrambling approach, pre-encoding module 202 includes a $3^{rd}$ order LFSR having that implements the binary polynomial $f(D)=D^3+D+1$. Each of the $2^p$ possible values of the p bits are mapped to one of eight unique initial states of the LFSR. The LFSR operates without input (feedback only) to generate a n+p bit pseudorandom sequence of output data that is XORed with the input block to form a candidate block The $2^p$ candidate blocks are generated by repeating this process for the $2^p$ unique initial states of the LFSR (optionally in parallel using $2^p$ LFSRs). The candidate blocks are evaluated to determine the best candidate block that becomes the pre-encoded data 204

Note that the LSFR order can be higher than three. In addition, other values of p and n, and other polynomials could likewise be employed when implementing alternative embodiments. Further, pre-encoding module 202 can be configured via configuration signal 220 to select between different RDS coding schemes with different values of n, p and/or that scramble the input signal via different polynomials.

In accordance with these particular embodiments, post-encoding module 210 can operate with the same values of n and p used by the pre-encoding module 202 but with a LFSR order=3 or 4, such as $f(D)=D^3+D+1$ and $f(D)=D^4+D+1$, respectively. Other polynomials could likewise be employed when implementing alternative embodiments. Further, post-encoding module 210 can be configured via configuration signal 222 to select between different RDS coding schemes with different values of n, p and/or that scramble the input signal via different polynomials.

While guided scrambling is described above as being implemented to minimize RDS, other criteria, such as minimum baseline error, maximize timing information, or other criteria could likewise be used within the broader scope of the present invention. Further, the guided scrambling approach can be used to implement RLL coding in the pre-encoding module 202 and/or post-encoding module 210 by using a k constraint as the criteria for selecting between candidate sequences. In addition, the pre-encoding module 202 and/or post-encoding module 210 can be selectively bypassed using configuration signals 220 and 222 in cases or configurations where better performance can be obtained without the use of one or both of these modules.

Consider an example where n=48 and p=2. The pre-encoding module 202 outputs 50 bits for each 48 bits of input. Different coding methods can be selected via configuration signal 220. For instance, RDS can be employed in a PMR configuration and RLL can be employed in a LMR configuration. Note that for the same input data, the output of the pre-encoding module 202 will vary based on the particular coding criteria (RDS, RLL, etc.) that has been selected. Representing a 48-bit block of write data as a, and the pre-encoded data 204 as b, the pre-encoded data 204 can further be represented as $b=[\gamma\ b_1]$, where $\gamma$ is the coding redundancy. For n=48 and p=2, $\gamma$ is the first 2 bits of each 50-bit block, and $b_1$ is the remaining 48 bits. Note that even though $b_1$ and a have the same size, $b_1 \neq a$.

The input of the ECC module 206 is a collection of blocks of b, such as for an entire sector. On one example, for the n=48 and p=2 code, ECC module 206 encodes these blocks of b, with a non-segregated approach wherein the blocks are aligned $\gamma\ b_1\ \gamma\ b_1\ \gamma\ b_1$ and encoded to create parity bits m included in ECC data 208. In an alternative example, a segregated approach is used wherein the blocks are aligned $\gamma\ \gamma\ \gamma\ \gamma\ \gamma\ \ldots\ b_1\ b_1\ b_1\ b_1\ b_1\ \ldots$ to create parity bits m included in ECC data 208. The post-encoding module 210 operates on $[\gamma\ m]$, and the post-encoded data 212 can be represented as $m_1$, and the combined data, can be represented as $c_1$, where $c_1=[b_1\ m_1]$. Note that by post-encoding the redundancy introduced by the pre-encoding module 202, the design is much simpler, and the format efficiency cost for doing this is very negligible. This is because the code rate of post-encoding module 210 is 48/50, which is the same rate as the pre-encoding module 202. However, the post-encoding module 210 can be optimized to reduce error propagation.

Figure 5:
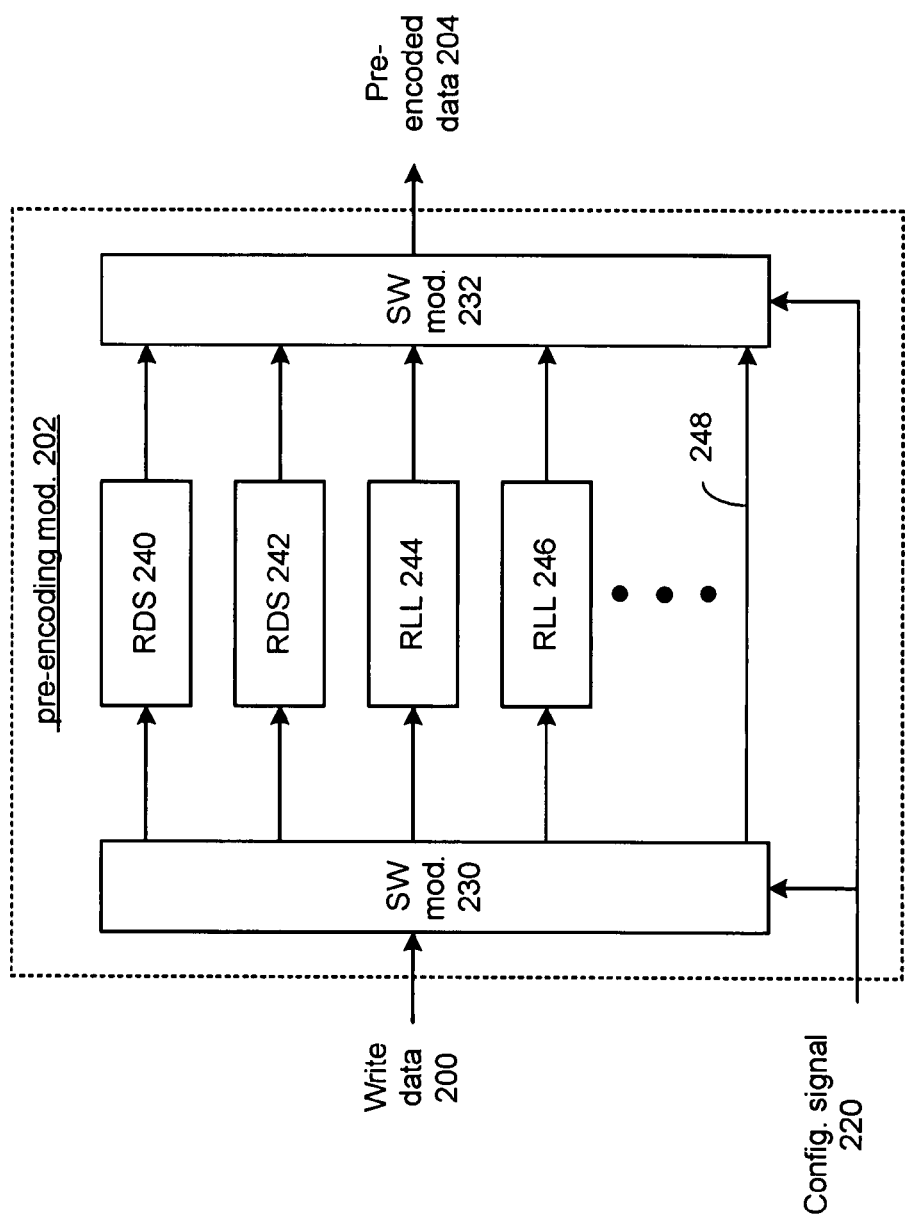
FIG. 5 presents a block diagram representation of a pre-encoding module 202 in accordance with an embodiment of the present invention.

FIG. 5 presents a block diagram representation of a pre-encoding module 202 in accordance with an embodiment of the present invention. In this embodiment, pre-encoding module 202 includes a plurality of encoding methods, such as RDS encoding methods 240 and 242, and RLL encoding methods 244 and 246 that can be selected by switch modules 230 and 232 in response to configuration signal 220. Each of these encoding methods 240, 242, 244 and 246 and the switching modules 230 and 232 can be implemented using a shared or dedicated processor that runs software or firmware. Further the encoding methods 240, 242, 244 and 246 can be implemented with one or more linear feedback shift registers or other circuits, either shared or dedicated to each method and further the switch modules 230 and 232 can be implemented with multiplexers, demultiplexers, discrete switches or other hardware. In addition, the coding performed by pre-encoding module 202 can be bypassed by the selection of bypass line 248, that itself can be implemented in hardware, software or firmware. In this fashion, pre-encoding module can be programmed to one or a plurality of mode of operations to implement one of a plurality of RDS codes, one of a plurality of RLL codes, one of a plurality of other codes, and/or bypassed, either by a designer or dynamically during operation.

Figure 6:
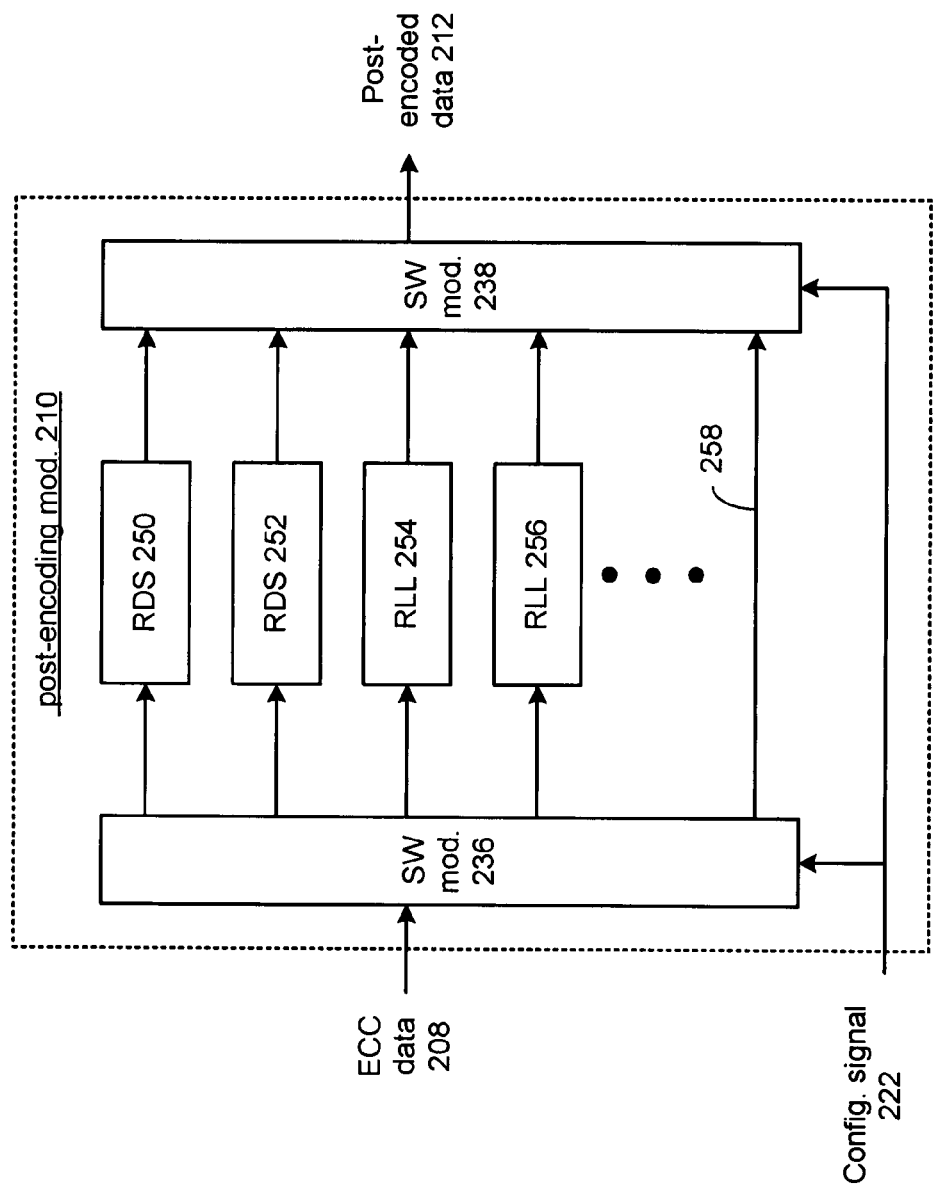
FIG. 6 presents a block diagram representation of a post-encoding module 210 in accordance with an embodiment of the present invention.

FIG. 6 presents a block diagram representation of a post-encoding module 210 in accordance with an embodiment of the present invention. Similarly, post-encoding module 210 can implement a plurality of encoding methods, such as RDS encoding methods 250 and 252, and RLL encoding methods 254 and 256 that can be selected by switch modules 236 and 238 in response to configuration signal 222. Each of these encoding methods 250, 252, 254 and 256 and the switching modules 236 and 238 can be implemented using a shared or dedicated processor that runs software or firmware. Further the encoding methods 250, 252, 254 and 256 can be implemented with one or more linear feedback shift registers or other circuits, either shared or dedicated to each method and further the switch modules 236 and 238 can be implemented with multiplexers, demultiplexers, discrete switches or other hardware. In addition, the coding performed by post-encoding module 210 can be bypassed by the selection of bypass line 258, that itself can be implemented in hardware, software or firmware. In this fashion, post-encoding module can be programmed to one or a plurality of mode of operations to implement one of a plurality of RDS codes, one of a plurality of RLL codes, one of a plurality of other codes, and/or bypassed, either by a designer or dynamically during operation.

Figure 7:
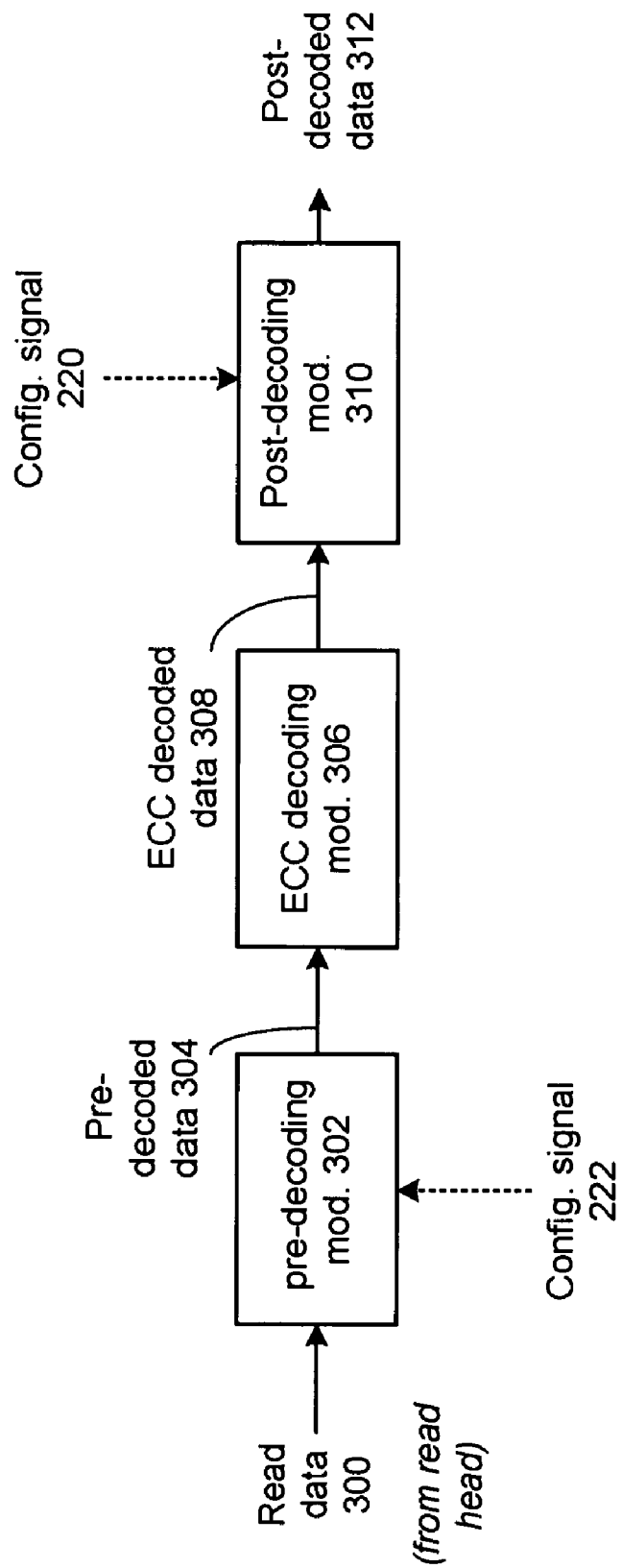
FIG. 7 presents a block diagram representation of components of read/write channel 140 in accordance with an embodiment of the present invention.

FIG. 7 presents a block diagram representation of components of read/write channel 140 in accordance with an embodiment of the present invention. In particular, portions of the read channel of the read/write channel 140 are presented that process read data derived from the read head to produce post-decoded data 312. While not expressly shown, signals from the read head can be amplified, filtered and sampled and/or processed in other ways to produce read data 300.

Pre-decoding module 302, optionally programmable based on configuration signal 222, decodes read data to produce pre-decoded data 304. Error correcting code (ECC) decoding module 306 generates ECC decoded data 308 based on the pre-decoded data 304. Post-decoding module 310, optionally programmed via configuration signal 220, decodes the ECC decoded data 308 to produce post-decoded data 312 that can be used to derive the user data, either by itself or via further processing. It should be noted that these components operate in a reciprocal fashion components of FIG. 3 with pre-decoding module 302 operating to decode the encoding performed by post-encoding module 210, ECC decoding module 306 operating to decode the encoding performed by ECC module 206, and post-decoding module 310 operating to decode the encoding performed by pre-encoding module 202. In this fashion, program states of pre-decoding module 302 and post-decoding module 310 correspond, in response to configuration signals 222 and 220, reciprocally to the program states of pre-encoding module 202 and post-encoding module 210.

In accordance with the embodiment discussed in conjunction with FIG. 3 wherein the write data 200 has been pre-scrambled, additional post decoding can be performed to descramble this pre-scrambling based on a either a predetermined scrambling method or scrambling seed, or based on the actual scrambling seed used and recovered from the data. In particular, where different scrambling seeds are used in cooperation with optional write abort module 218, additional post decoding can descramble the pre-scrambling based on the particular scrambling seed that was employed and incorporated in the write data 200.

Figure 8:
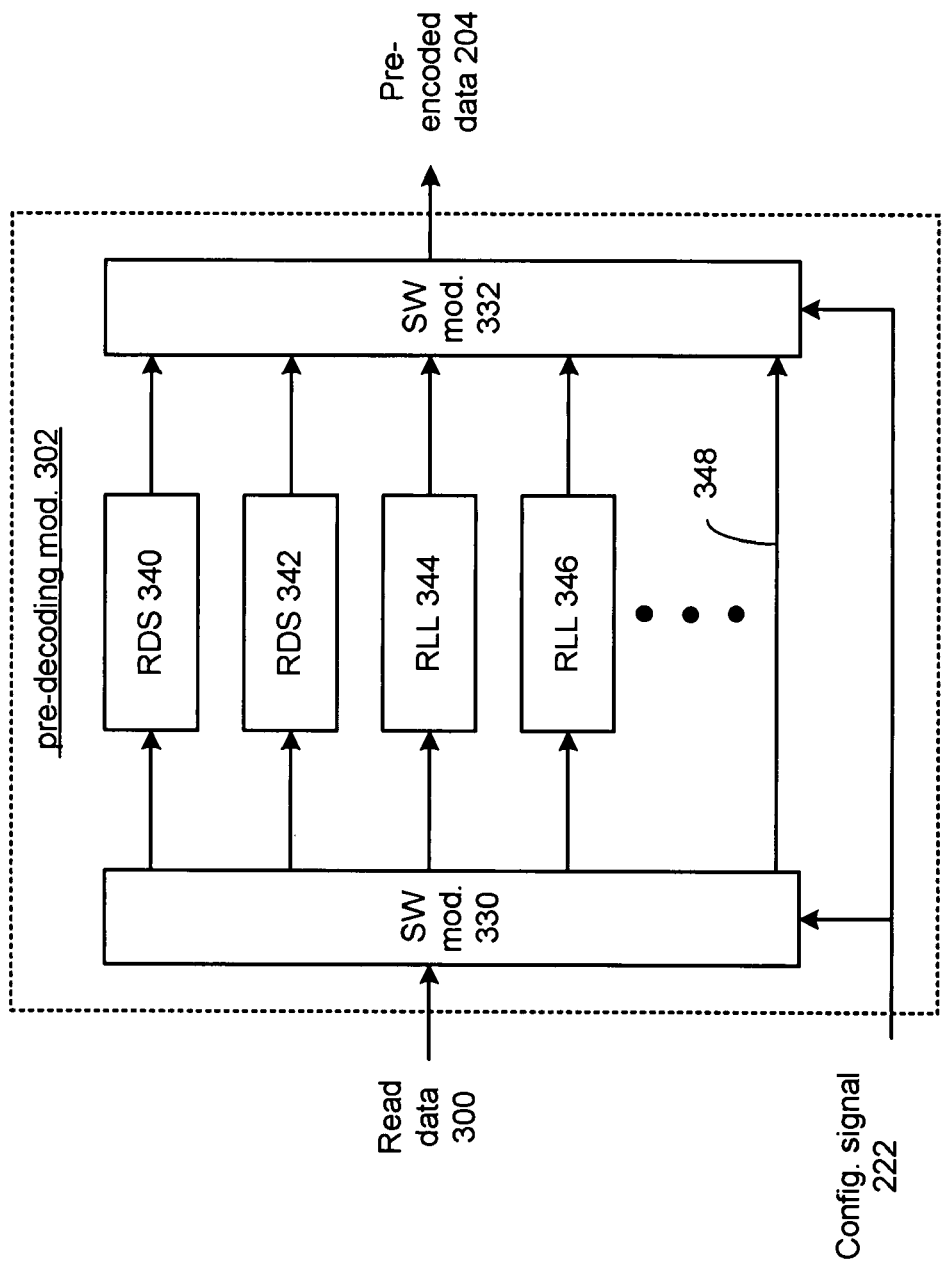
FIG. 8 presents a block diagram representation of a pre-decoding module 302 in accordance with an embodiment of the present invention.

FIG. 8 presents a block diagram representation of a pre-decoding module 302 in accordance with an embodiment of the present invention. In this embodiment, pre-decoding module 302 includes a plurality of decoding methods, such as RDS decoding methods 340 and 342, and RLL decoding methods 344 and 346 that can be selected by switch modules 330 and 332 in response to configuration signal 220. Each of these decoding methods 340, 342, 344 and 346 and the switching modules 330 and 332 can be implemented using a shared or dedicated processor that runs software or firmware. Further the decoding methods 340, 342, 344 and 346 can be implemented with one or more linear feedback shift registers or other circuits, either shared or dedicated to each method and further the switch modules 330 and 332 can be implemented with multiplexers, demultiplexers, discrete switches or other hardware. In addition, the coding performed by pre-decoding module 302 can be bypassed by the selection of bypass line 348, that itself can be implemented in hardware, software or firmware. In this fashion, pre-decoding module 302 can be programmed to one or a plurality of mode of operations to implement one of a plurality of RDS codes, one of a plurality of RLL codes, one of a plurality of other codes, and/or bypassed, either by a designer or dynamically during operation.

Figure 9:
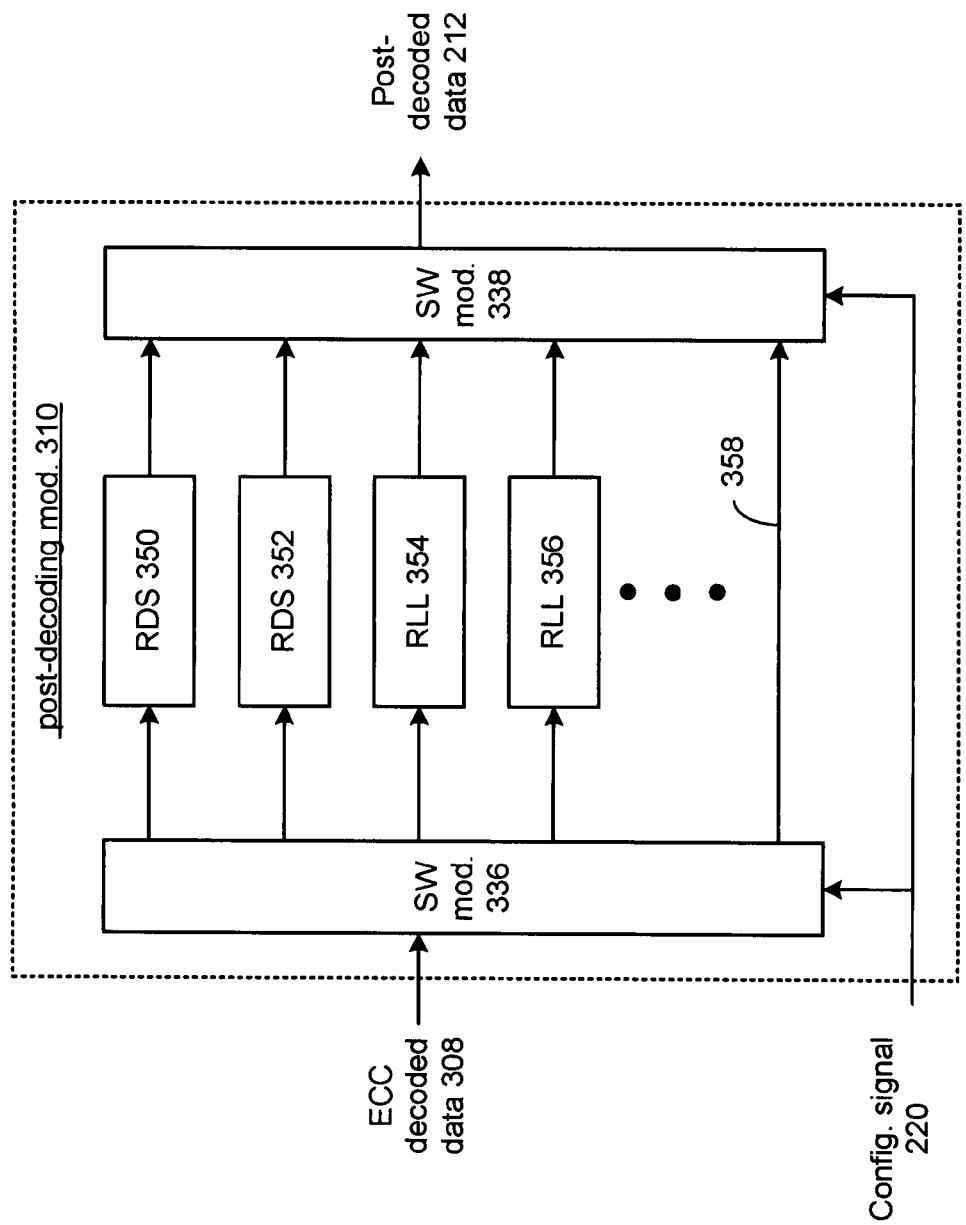
FIG. 9 presents a block diagram representation of a post-decoding module 310 in accordance with an embodiment of the present invention.

FIG. 9 presents a block diagram representation of a post-decoding module 310 in accordance with an embodiment of the present invention. Similarly, post-decoding module 310 can implement a plurality of decoding methods, such as RDS decoding methods 330 and 352, and RLL decoding methods 354 and 356 that can be selected by switch modules 336 and 338 in response to configuration signal 222. Each of these decoding methods 350, 352, 354 and 356 and the switching modules 336 and 338 can be implemented using a shared or dedicated processor that runs software or firmware. Further the decoding methods 350, 352, 354 and 356 can be implemented with one or more linear feedback shift registers or other circuits, either shared or dedicated to each method and further the switch modules 236 and 238 can be implemented with multiplexers, demultiplexers, discrete switches or other hardware. In addition, the decoding performed by post-decoding module 310 can be bypassed by the selection of bypass line 358, that itself can be implemented in hardware, software or firmware. In this fashion, post-decoding module 310 can be programmed to one or a plurality of mode of operations to implement one of a plurality of RDS codes, one of a plurality of RLL codes, one of a plurality of other codes, and/or bypassed, either by a designer or dynamically during operation.

Figure 10:
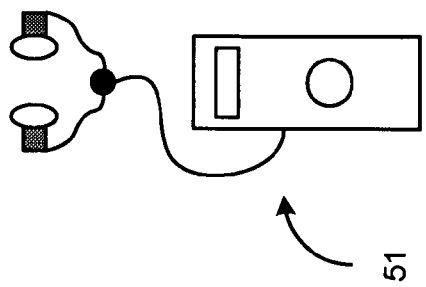
FIG. 10 presents a pictorial representation of a handheld audio unit 51 in accordance with an embodiment of the present invention.

FIG. 10 presents a pictorial representation of a handheld audio unit 51 in accordance with an embodiment of the present invention. In particular, disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

Figure 11:
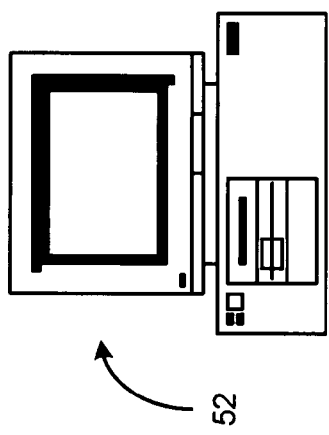
FIG. 11 presents a pictorial representation of a computer 52 in accordance with an embodiment of the present invention.

FIG. 11 presents a pictorial representation of a computer 52 in accordance with an embodiment of the present invention. In particular, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

Figure 12:
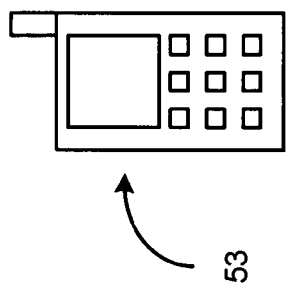
FIG. 12 presents a pictorial representation of a wireless communication device 53 in accordance with an embodiment of the present invention.

FIG. 12 presents a pictorial representation of a wireless communication device 53 in accordance with an embodiment of the present invention. In particular, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide streaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Figure 13:
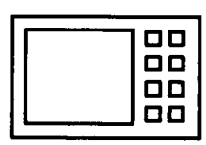
FIG. 13 presents a pictorial representation of a personal digital assistant 54 in accordance with an embodiment of the present invention.

FIG. 13 presents a pictorial representation of a personal digital assistant 54 in accordance with an embodiment of the present invention. In particular, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

Figure 14:
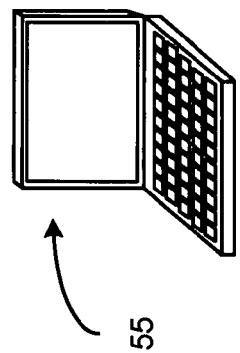
FIG. 14 presents a pictorial representation of a laptop computer 55 in accordance with an embodiment of the present invention.

FIG. 14 presents a pictorial representation of a laptop computer 55 in accordance with an embodiment of the present invention. In particular, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

Figure 15:
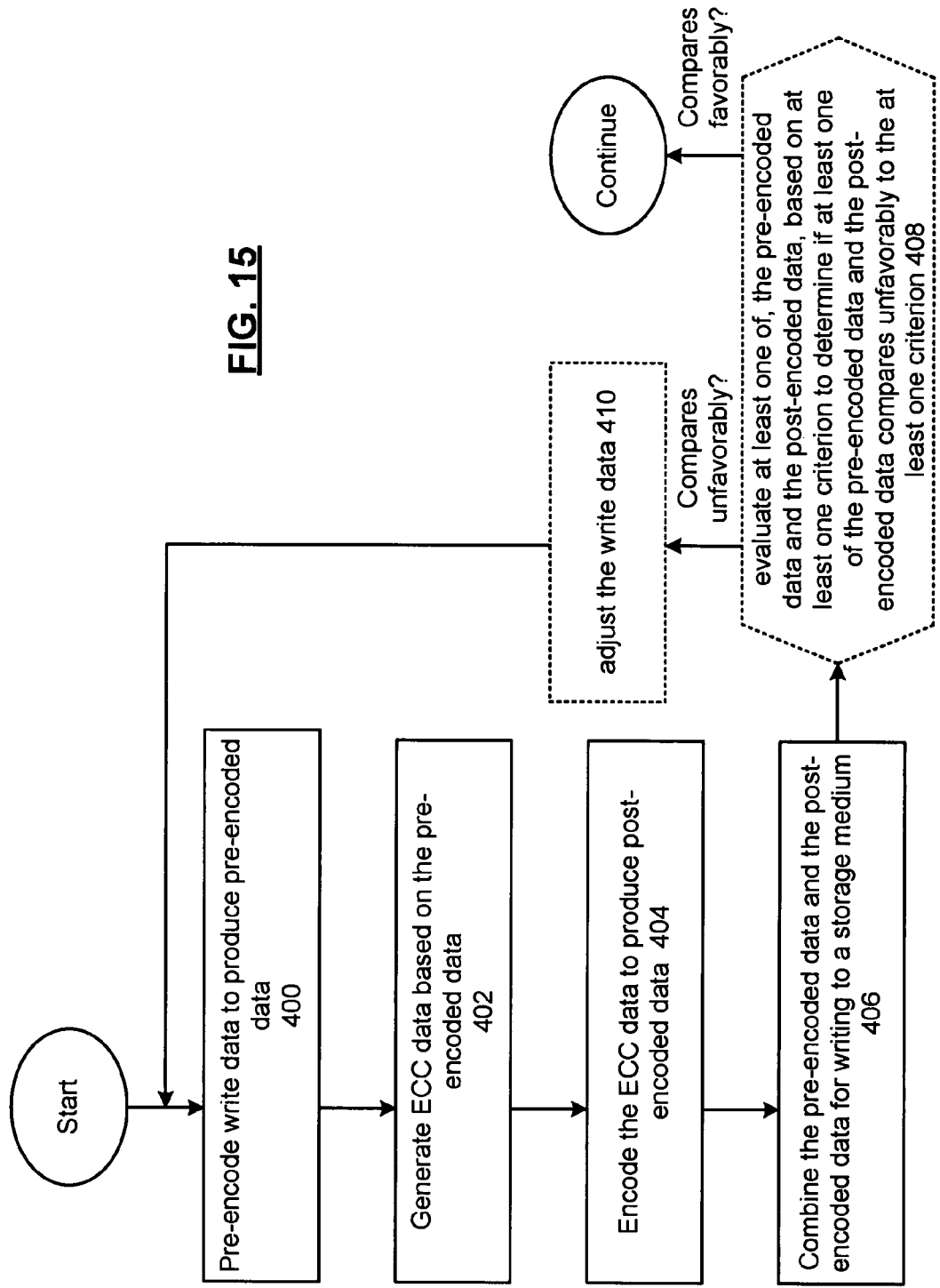
FIG. 15 presents a flowchart representation of a method in accordance with an embodiment of the present invention.

FIG. 15 presents a flowchart representation of a method in accordance with an embodiment of the present invention. In particular, a method is presented that can be used in conjunction with one or more of the features or functions described in association with FIGS. 1-14. In step 400, write data is pre-encoded to produce pre-encoded data. In step 402, error correcting code (ECC) data is generated based on the pre-encoded data. In step 404 the ECC data is encoded to produce post-encoded data. In step 406, the pre-encoded data and the post-encoded data are combined for writing to the storage medium.

In an embodiment of the present invention, step 406 includes concatenating the pre-encoded data and the post-encoded data. The ECC data can include parity data and step 404 can produce the post-encoded data by encoding the parity data Step 400 can encode the write data by at least one of, run length limited coding and running digital sum coding and can be implemented by a guided-scrambling coding. Step 400 can further encode the write data by run length limited coding in a first mode of operation and encode the write data by running digital sum coding in a second mode of operation.

In an embodiment of the present invention, step 404 can encode the ECC data by at least one of, run length limited coding and running digital sum coding, and can encode the ECC data by run length limited coding in a first mode of operation and encode the ECC data by running digital sum coding in a second mode of operation. Further step 404 can encode the ECC data by a first running digital sum coding in a first mode of operation and encode the ECC data by a second running digital sum coding in a second mode of operation. Step 404 can encode the ECC data by a guided-scrambling running digital sum coding.

In embodiments of the present invention, steps 400 and/or 404 can each operate in one mode of operation and bypassed in another mode of operation. In addition, the method can further include step 408 of evaluating at least one of, the pre-encoded data and the post-encoded data, based on at least one criterion and determining whether at least one of the pre-encoded data and the post-encoded data compares favorably or unfavorably to the at least one criterion. When the pre-encoded data and/or the post-encoded data compares unfavorably to the at least one criterion, the method proceeds to optional step 410, the write data is adjusted and the method proceeds back to step 400. When the pre-encoded data and/or the post-encoded data compares favorably to the at least one criterion, the method continues and the write data can be written to the storage media.

Figure 16:
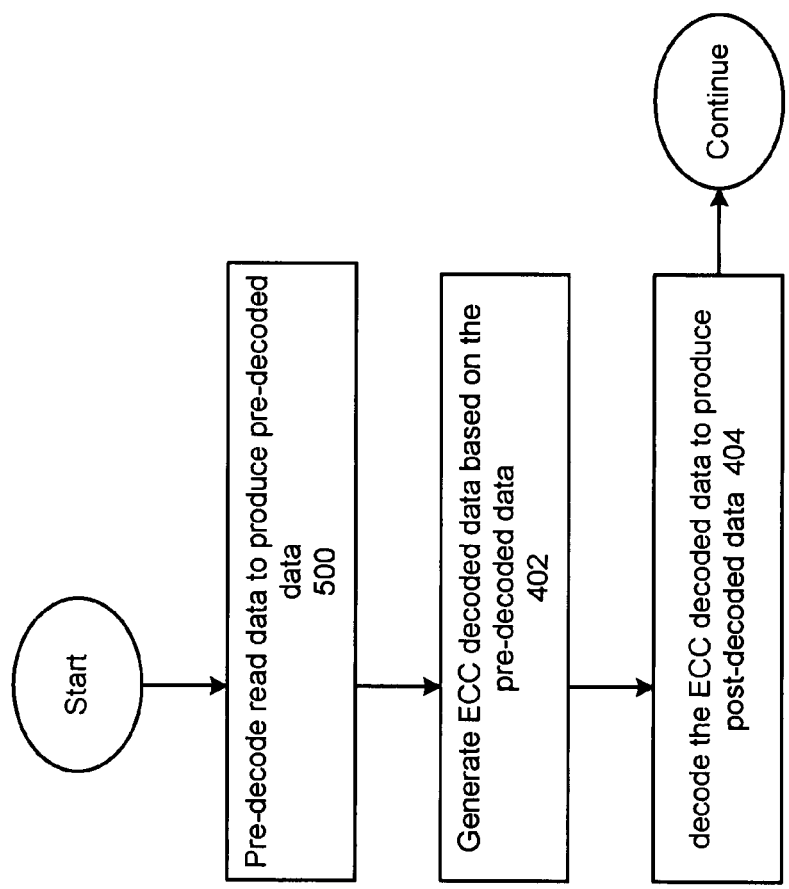
FIG. 16 presents a flowchart representation of a method in accordance with an embodiment of the present invention.

FIG. 16 presents a flowchart representation of a method in accordance with an embodiment of the present invention In particular, a method is presented that can be used in conjunction with one or more of the features or functions described in association with FIGS. 1-15. In step 500 read data is pre-encoded to produce pre-decoded data. In step 502, ECC decoded data is generated based on the pre-coded data. In step 404, ECC decoded data is further decoded to produce post decoded data 404. As discussed in conjunction with FIG. 7, these steps operate in a reciprocal fashion to the steps of FIG. 15 and are therefore subject to the many features and functions described in conjunction with FIGS. 1-15.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a read/write channel. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A read/write channel for use in a digital storage system having a storage medium, the read/write channel comprising:
    a write channel that includes:
        a pre-encoding module that encodes write data to produce pre-encoded data;
        an error correcting code (ECC) module, coupled to the pre-encoding module, that generates ECC data based on the pre-encoded data;
        a post-encoding module, coupled to the ECC module, that encodes the ECC data to produce post-encoded data;
        a combining module, coupled to the pre-encoding module and the post-encoding module for combining the pre-encoded data and the post-encoded data for writing to the storage medium; and a write abort module that evaluates at least one of, the pre-encoded data and the post-encoded data, based on at least one criterion, and that generates a feedback signal when at least one of the pre-encoded data and the post-encoded data compares unfavorably to the at least one criterion, wherein the write data is adjusted in response to the feedback signal; and a read channel coupled to process read data from the storage medium.

2. The read/write channel of claim 1 wherein the combining module concatenates the pre-encoded data and the post-encoded data.

3. The read/write channel of claim 1 wherein the ECC module uses at least one of, a segregated approach and a non-segregated approach, to produce parity data and the post encoding module produces the post-encoded data by encoding the parity data.

4. The read/write channel of claim 1 wherein the pre-encoding module encodes the write data by at least one of, run length limited coding and running digital sum coding.

5. The read/write channel of claim 1 wherein the pre-encoding module encodes the write data by a guided-scrambling including at least one of: traditional scrambling and binary polynomial division.

6. The read/write channel of claim 1 wherein the pre-encoding module is programmable to encode the write data by run length limited coding in a first mode of operation and to encode the write data by running digital sum coding in a second mode of operation.

7. The read/write channel of claim 1 wherein the post-encoding module encodes the ECC data by at least one of, run length limited coding and running digital sum coding.

8. The read/write channel of claim 1 wherein the post-encoding module is programmable to encode the ECC data by run length limited coding in a first mode of operation and to encode the ECC data by running digital sum coding in a second mode of operation.

9. The read/write channel of claim 1 wherein the post-encoding module is programmable to encode the ECC data by a first running digital sum coding in a first mode of operation and to encode the ECC data by a second running digital sum coding in a second mode of operation.

10. The read/write channel of claim 1 wherein the post-encoding module encodes the ECC data by a guided-scrambling including at least one of: traditional scrambling and binary polynomial division.

11. The read/write channel of claim 1 wherein the pre-encoding module is operable in a first mode of operation and is bypassed in a second mode of operation.

12. The read/write channel of claim 1 wherein the post-encoding module is operable in a first mode of operation and is bypassed in a second mode of operation.

13. The read/write channel of claim 1 wherein the read channel includes:

a pre-decoding module that decodes read data to produce pre-decoded data;

an error correcting code (ECC) decoding module, coupled to the pre-decoding module, that generates ECC decoded data based on the pre-decoded data; and a post-decoding module, coupled to the ECC decoding module, that decodes the ECC decoded data to produce post-decoded data.

14. A method for use in a digital storage system having a storage medium, the method comprising:

pre-encoding write data to produce pre-encoded data;

generating error correcting code (ECC) data based on the pre-encoded data;

encoding the ECC data to produce post-encoded data; and combining the pre-encoded data and the post-encoded data for writing to the storage medium;

evaluating at least one of, the pre-encoded data and the post-encoded data, based on at least one criterion;

generating a feedback signal when at least one of the pre-encoded data and the post-encoded data compares unfavorably to the at least one criterion; and adjusting the write data in response to the feedback signal.

15. The method of claim 14 wherein the step of combining concatenates the pre-encoded data and the post-encoded data.

16. The method of claim 15 wherein the step of encoding the write data is operable in a first mode of operation and is bypassed in a second mode of operation.

17. The method of claim 15 wherein the step of encoding the ECC data is operable in a first mode of operation and is bypassed in a second mode of operation.

18. The method of claim 14 wherein encoding the ECC data includes using at least one of, a segregated approach and a non-segregated approach, to produce parity data and step of encoding the ECC data produces the post-encoded data by encoding the parity data.

19. The method of claim 14 wherein the step of encoding the write data encodes the write data by run length limited coding in a first mode of operation and encodes the write data by running digital sum coding in a second mode of operation.

20. The method of claim 14 wherein the step of encoding the ECC data encodes the ECC data by at least one of, run length limited coding and running digital sum coding.

21. The method of claim 14 wherein the step of encoding the ECC data encodes the ECC data by run length limited coding in a first mode of operation and encodes the ECC data by running digital sum coding in a second mode of operation.

22. The method of claim 14 wherein the step of encoding the ECC data encodes the ECC data by a first running digital sum coding in a first mode of operation and encodes the ECC data by a second running digital sum coding in a second mode of operation.

* * * * *

UNITED STATES PATENT AND TRADEMARK OFFICE
CERTIFICATE OF CORRECTION

PATENT NO. : 8,024,640 B2  
APPLICATION NO. : 11/923472  
DATED : September 20, 2011  
INVENTOR(S) : William Gene Bliss et al.

Page 1 of 1

It is certified that error appears in the above-identified patent and that said Letters Patent is hereby corrected as shown below:

Col. 14, line 16, claim 14: delete "and"

Signed and Sealed this
Fifteenth Day of January, 2013

David J. Kappos
*Director of the United States Patent and Trademark Office*